United States Patent [19]
Johnston

[11] Patent Number: 5,579,755
[45] Date of Patent: Dec. 3, 1996

[54] BARBECUE GRILL CART ASSEMBLY

[75] Inventor: Robert L. Johnston, Columbus, Ga.

[73] Assignee: W. C. Bradley Company, Columbus, Ga.

[21] Appl. No.: 289,502

[22] Filed: Aug. 12, 1994

[51] Int. Cl.$^6$ .................................................... F24C 15/30
[52] U.S. Cl. ..................... 126/41 R; 126/25 R; 126/277; 126/305
[58] Field of Search ................................ 126/41 R, 25 R, 126/277, 305

[56]  References Cited

U.S. PATENT DOCUMENTS

| | | | |
|---|---|---|---|
| 2,503,807 | 4/1950 | Dolas | 126/25 R |
| 3,091,343 | 5/1963 | Neumann | 126/25 R |
| 4,054,123 | 10/1977 | Corter | 126/25 R X |
| 4,635,613 | 1/1987 | Tucker et al. | 126/41 R X |
| 4,886,045 | 12/1989 | Ducate, Jr. et al. | 126/41 R |
| 5,027,788 | 7/1991 | Schlosser et al. | 126/25 R |
| 5,140,973 | 8/1992 | Home | 126/41 R |
| 5,168,796 | 12/1992 | Porton et al. | 126/41 R X |

*Primary Examiner*—Larry Jones
*Attorney, Agent, or Firm*—James W. Kayden; Hopkins & Thomas

[57] ABSTRACT

A barbecue grill cart assembly is disclosed, the assembly having a plurality of legs which are partially fastened together at their lower ends by a shelf and secured at their upper ends by a grill containment surface. The upper grill containment surface has a rectangular middle section with a portion removed for receiving a grill, and at least one side shelf extending towards the front of the grill cart assembly at an angle greater than 0°.

15 Claims, 3 Drawing Sheets

BARBECUE GRILL CART ASSEMBLY

BACKGROUND OF THE INVENTION

It is common for barbecue grills, and especially gas barbecue grills, to be situated on a movable cart. Such carts, in general, have a grill located centrally on the top of the cart, and may include a plurality of shelves. Most such carts have side shelves on or close to the level of the cooking surface of the barbecue grill and a bottom or lower shelf for supporting an LP gas tank, supplies, etc. Many carts also include wheels for ease in moving the cart around. The cart is normally designed so as to locate the cooking surface of the grill and the upper shelves at approximately the waist level of an adult for ease and comfort of use of the grill.

As a result of the elevated mounting of the grill, barbecue grill carts tend to be top heavy. Consequently, various means have been developed to insure the stability of the cart. In general, braces are normally provided between the legs of the assembly, extending from front to back and from one side to the other, at both upper and lower regions of the legs. These braces can be struts or tubular members. Examples of carts that have greatly increased stability and utility in use are shown by U.S. Pat. Nos. 5,109,834 and 5,072,718, which are commonly owned with the present application.

Recently, manufacturers of grill carts have sought to make the carts more user friendly. Thus, manufacturers have supplied the grill carts with such features as upper shelves alongside the grill for preparation of food items and also for use as storage areas. In addition, manufacturers have supplied the upper area of the grill cart with auxiliary burners and controls for the burners to allow for the cooking of items other than directly on the barbecue grill.

SUMMARY OF THE INVENTION

It is, therefore, one of the principal objects of the present invention to provide a cart assembly for a barbecue grill which has increased operator convenience due to the provision of storage areas located directly within the grill cart.

Another object of the present invention is to provide a barbecue grill cart assembly which provides surfaces for the on-site preparation of foods and which, therefore, increases the freshness and safety of prepared foods.

A further object of the present invention is to provide a cart assembly for a barbecue grill that allows the operator standing in front of the grill to easily access grill storage areas and upper shelf areas.

A still further object of the present invention is to provide a cart assembly for a barbecue grill which has more stable rolling means and which is, therefore, more easily moved for storage and use.

These and other objects are attained by the present invention which relates to a cart assembly for a barbecue grill which has a generally rectangular grill containment area with angularly oriented side shelf areas. The cart assembly also normally includes wheels for mobility and an LP gas tank as a fuel source. Certain aspects or features of the cart can also be utilized with a fixed mount or post-mounted grill and these are considered to be within the scope of the present invention. The cart assembly includes a plurality of legs forming a rectangular area which are partially fastened together by a lower shelf which acts as a brace by connecting all four legs of the cart assembly. The upper portions of the legs are secured by a combination of strut means and by the grill casting itself. One or more shelves extend from the upper grill containment surface on approximately the same plane as this upper surface area and are angularly directed toward the grill operator. At least one of these upper side shelf areas is equipped with underlying structures, such as storage bins. The top surfaces of the shelf areas are fixed in position but the underlying structures are rotatably connected to a front leg so as to provide access to the interior of these storage areas or to the interior of the cart assembly. Each leg is attached to a rolling caster and to the lower shelf.

Various additional objects and advantages of the present invention will become apparent from the following detailed description, with reference to the accompanying drawings.

DETAILED DESCRIPTION OF THE PREFERRED EMBODIMENT

Figure 1:
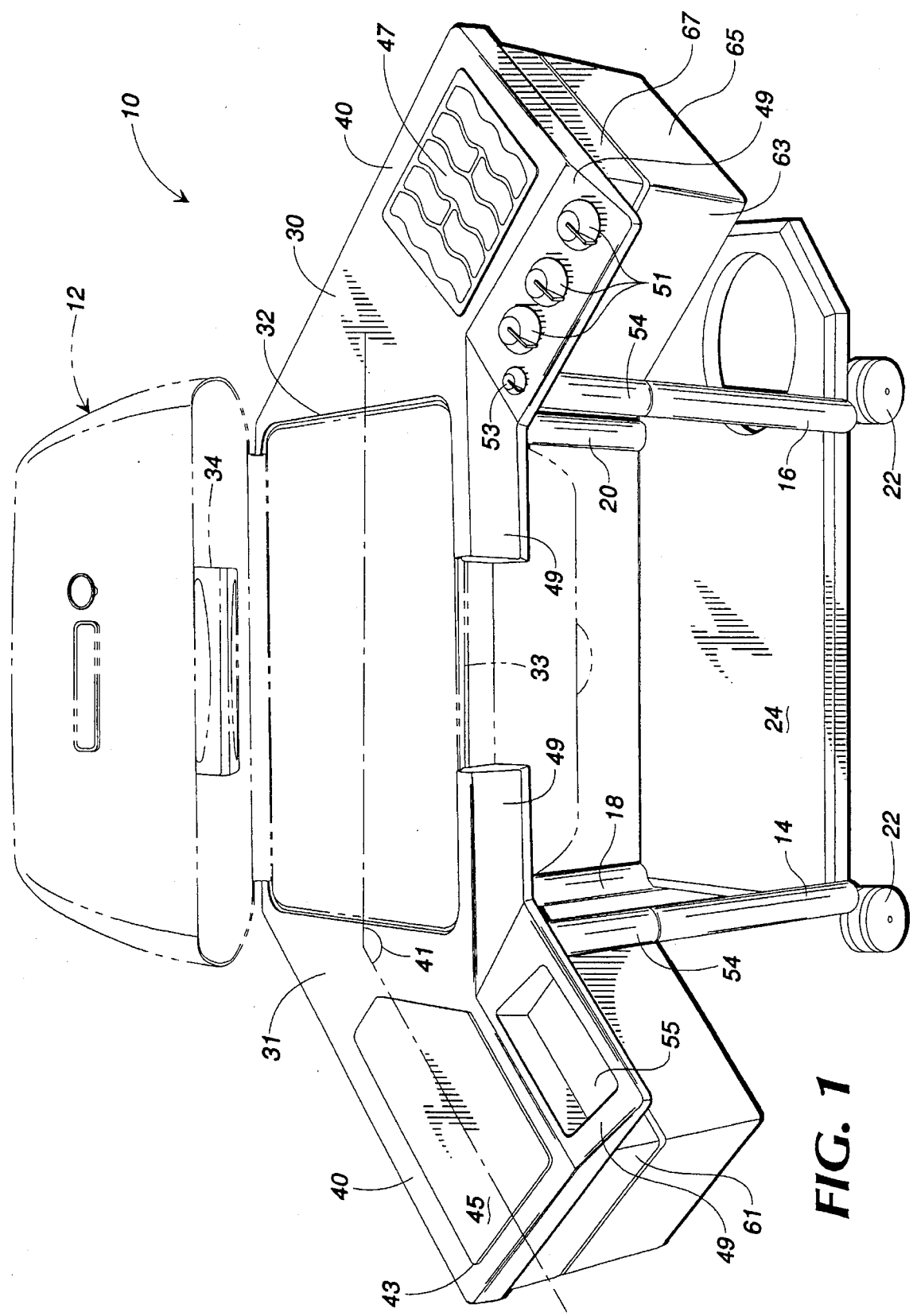
FIG. 1 is a perspective view of the present cart assembly, with a barbecue grill mounted thereon.

Referring now specifically to the drawings, and to FIG. 1 in particular, numeral 10 designates, generally, the present barbecue grill cart assembly, shown here supporting a barbecue grill 12. The structural members of the cart are preferably fabricated from steel, aluminum, etc., but may be provided from any other suitable materials which provide the necessary strength and resistance to heat.

The present cart includes front leg assemblies 14 and 16 and rear legs 18 and 20. Each leg has rolling means, such as casters 22, extending from the bottom end. The front casters 22a have locking means. Bottom shelf 24 is oriented horizontally and connects legs 14, 16, 18, and 20. Bottom shelf 24 is essentially rectangular with a protrusion on one side outside the area defined by the four legs. This protruding area has a hole formed therein for location of the LP gas tank (not shown). At each point where a leg meets the bottom shelf, a receiving means is formed therein, such as semicircular cutout 25, shown in FIG. 2. The receiving means could also be an aperture, or a similar locking construction.

Figure 2:
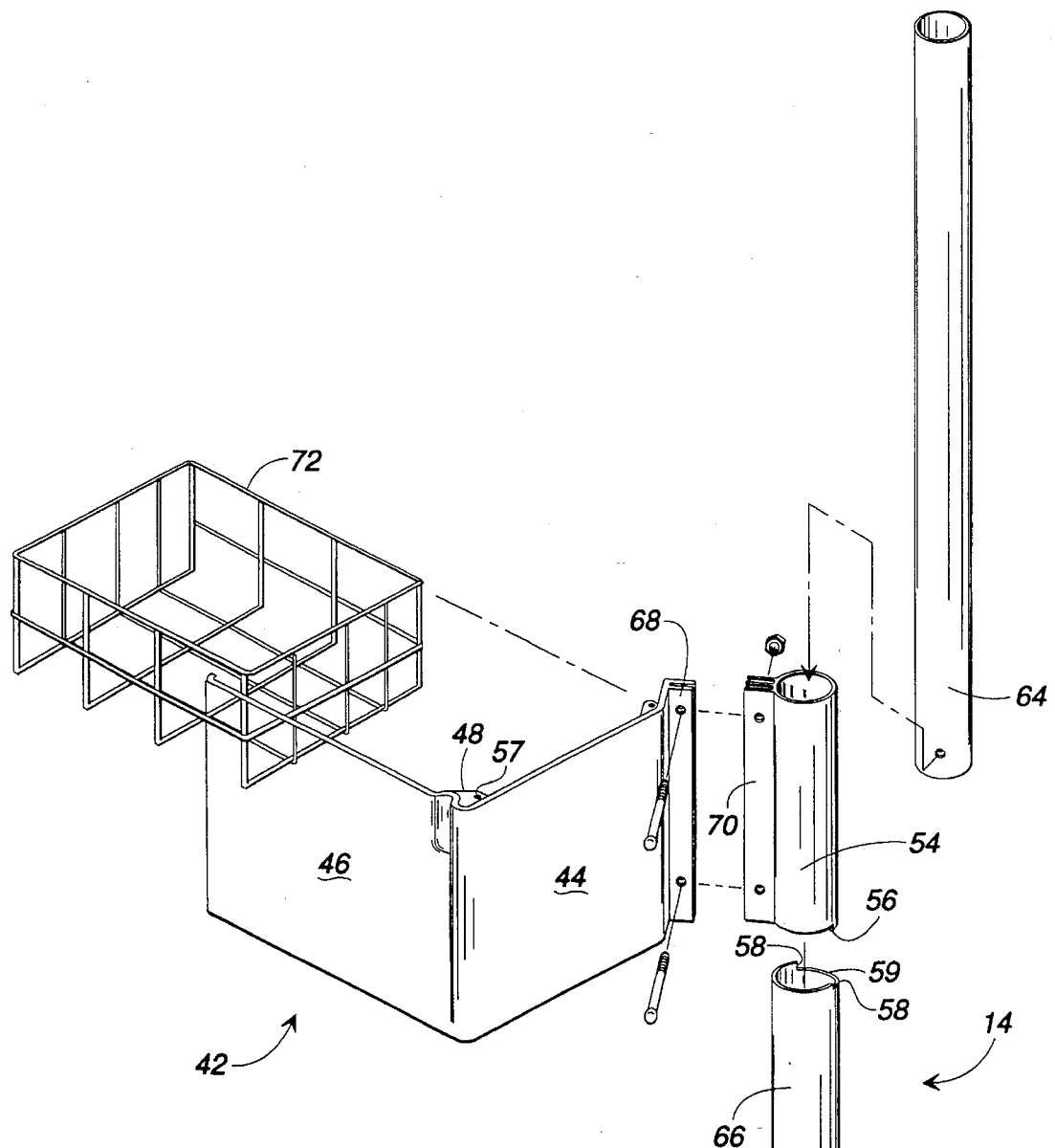
FIG. 2 is an exploded view of a leg assembly of the present cart assembly showing the leg and attached caster and the bottom shelf and the attachment of a storage bin.
Figure 4:
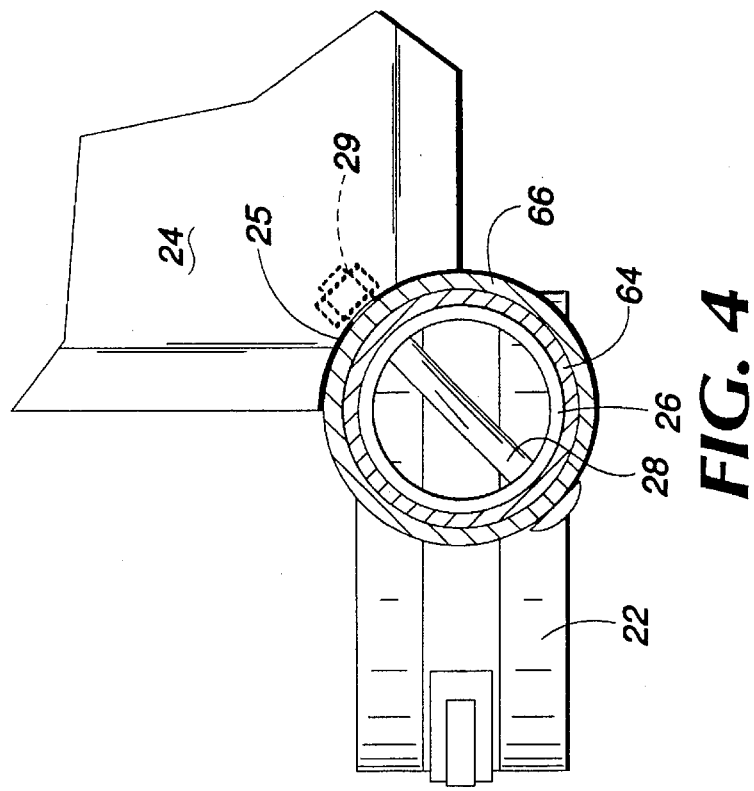
FIG. 4 is a cross-sectional view of the leg-coaster-bottom shelf assembly.
Figure 3:
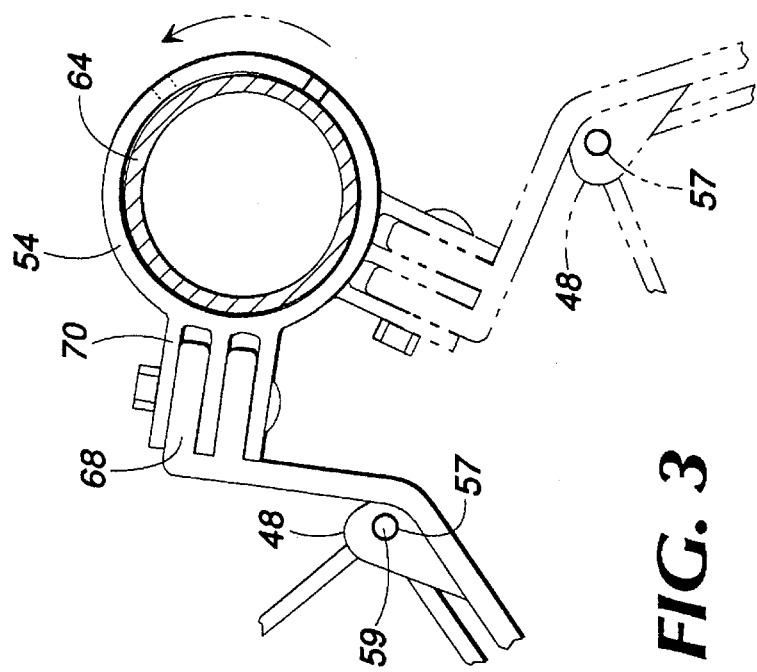
FIG. 3 is a cross-sectional view of the storage bin attachment in open and closed positions.

As shown more clearly in FIG. 2–4, a front leg assembly, shown here as right leg assembly 14, comprises an inner steel cylindrical member 64 and upper and lower plastic sleeves 54 and 66, respectively. On the bottom of the leg, caster 22 has a yoke 26 which extends into the inner leg member. Fastening means, such as bolt 28 and nut 29, then fasten together bottom sleeve 66, the inner leg member 64, yoke 26 and bottom shelf 24.

The left side leg assemblies 14 and 18 and the right side leg assemblies 16 and 20, as viewed in FIG. 1, are normally connected together to provide a left and right leg pair. Typically, a strut or brace member (not shown) extends between the leg pairs near the upper ends thereof and is welded or bolted in place. An example of this type of construction is shown by U.S. Pat. No. 5,072,718. The barbecue grill 12 is seated on these struts and may have one or more bolts on each side which secure the grill casting to the cart.

The cart assembly includes upper shelves 30 and 31 which are secured to the grill casting using bolts or other suitable means. These shelves are normally die-cast aluminum or other suitable material and may thus be cast in any number of different shapes and/or sizes. A particularly unique aspect of the present invention; however, is the angular presentation of the side shelves relative to the grill user. While cooking food on the grill, the user has all of the side shelf area within easy reach. Using the front edge 33 of the grill casting as a reference point, it can be seen that the side shelves are disposed at approximately a forty-five degree (45°) angle relative to edge 33. While shown at this angle, it is understood to be within the scope of the present intention that this angle can be between zero and ninety degrees (0°–90°).

Side shelves 30 and 31 are surfaces used for activities related to grilling such as chopping of food items and cooking of side dishes, sauces, etc. Left side shelf 31 has a recess 43 defined there which receives a chopping board 45. The other side shelf a side burner with cooking surface 47. The front ends of the side shelves slope downwardly forming panels 49. The panel on the right side is used for the burner control knobs 51 and an ignitor 53. The panel on the left side has a receptacle 55 formed therein which can be used for condiments, salt and pepper shakers, etc. Other features such as hooks, apertures, (not shown) may also be formed therein for hanging towels, cooking utensils, etc. The area between the angled panels 49 in the center of the side shelves is left open to receive the handle 34 of the barbecue grill hood.

As shown in detail in FIG. 2, the front cart leg construction is arranged to provide for rotation of the plastic sleeve 54 around leg 64 and on top of sleeve 66. The rotation is limited by a stop or tab 56, which protrudes downwardly from the lower end of sleeve 54. Sleeve 66 has abutments 58 which protrude upwardly from the upper end of sleeve 66. The distance between the abutments, designated by numeral 59, defines the extent of relative rotation allowed between the aligned sleeves. This construction is essentially identical on both legs, with the left and right sides being mirror images of one another.

The permitted rotation provides for a hidden storage bin on the left side of the cart assembly, as viewed in FIG. 1. The storage bin comprises a front panel 44 and a side panel 46, disposed substantially at right angles to one another. Ledges 48 or similar supports are provided in the interior of the adjacent panels 44 and 46 for supporting a bracket 72 or, alternatively, an open topped box (not shown). In the case of the basket, the ledges have apertures 57 into which a hanger 59 can be inserted to suspend the basket or box therein. the storage bin can be used for holding cooking utensils, food items condiments or sauces, or other items which the user may need or want for cooking on the grill.

The extent of the rotation of the hidden storage bin is shown in FIG. 3. The closed position is shown in solid lines while the open position is shown in phantom lines. From the fully closed or stored position, also shown in FIG. 1, the bin rotates toward the center of the cart assembly user's position, or cooking zone, to a fully open position for retrieval of stored items. As discussed hereinabove, the rotation is limited by stop 56 and the abutments 58. Located above the panels 44 and 46 is a decorative panel 61 which remains stationary as the storage bin is rotated between closed and open positions.

On the opposite side of the cart assembly is a similar rotatable panel assembly, comprising panels 63 and 65. A stationary, decorative panel 67 is disposed thereabove. This panel assembly hides the connections made between the LP gas bottle and the grill controls. It is also rotatable inwardly toward the user's position from the fully closed position shown in FIG. 1. This assembly is normally closed but may be opened, or swing inwardly to connect or disconnect the gas supply as necessary.

The present invention provides a cart assembly of superior operator convenience, which allows for greater ease in grill cooking and with less time spent gathering supplies from other locations. The design of the caster, leg and bottom shelf connection allows for greater stability.

It can thus be appreciated by those skilled in the art that a novel barbecue grill cart assembly and modifications thereof have been shown and described in detail herein. Various additional changes and modifications may be made without departing from the scope of the present invention.

I claim:

1. A barbecue grill cart assembly for supporting a barbecue grill near the upper portion thereof, said cart assembly comprising a plurality of upwardly extending spaced leg members disposed in a generally rectangular configuration of front and rear legs, said leg members being connected together by brace means extending between the leg members, said generally rectangular configuration of front and rear legs extending upward and supporting a generally planar top member, said top member having a middle portion adapted to receive a barbecue grill, and including shelf members disposed laterally from said middle portion on each side thereof at an angle greater than 0°.

2. A barbecue grill cart assembly as claimed in claimed in claim 1 wherein said angle ranges between 0° and 90°.

3. The barbecue grill cart assembly of claim 1 and further comprising a structure rotatably connected to the top area of a front leg beneath at least one of said shelves.

4. A barbecue grill cart assembly for receiving a barbecue grill comprising a plurality of generally vertical leg members disposed in a generally rectangular configuration of front and rear legs, said leg members being connected together by brace means extending between said leg members; a generally planar top surface supported by said leg members and having a middle portion with a hole cut therein for receiving a grill; said top member extending laterally and substantially continuously from said middle portion on both sides thereof and forming shelves extending at an angle relative to said middle portion; and a storage bin rotatably connected by sleeve means to the upper end of the front leg member.

5. A barbecue grill cart assembly as claimed in claim 4 and further comprising shelf members substantially co-planar with said middle portion and disposed at an angle greater than 0°.

6. A barbecue grill cart assembly as claimed in claim 5 wherein said storage bin has a first position beneath said shelf member and a second position rotatably recovered from said shelf member.

7. A barbecue grill cart assembly comprising:

a plurality of legs;

a brace means connecting the legs to form a generally rectangular frame structure;

an upper surface having a rectangular middle section with a portion removed for receiving a grill and shelves on either side of said middle section disposed at an angle thereto.

8. The barbecue grill cart assembly as defined in claim 7, in which said brace means comprises a horizontal bottom shelf connected to each leg near its bottom end.

9. The barbecue grill cart assembly as defined in claim 7, and further comprising at least one storage bin rotatable connected to the upper end of one of said legs.

10. The barbecue grill cart assembly as defined in claim 7, in which said upper surface on either side of said middle section is co-planar with said shelves and extends in a continuous manner from said middle section to form said shelves.

11. The barbecue grill cart assembly as defined in claim 7, in which at least one of said shelves comprises a side burner assembly.

12. The barbecue grill cart assembly as defined in claim 7, in which said angle is greater than 0°.

13. The barbecue grill cart assembly as defined in claim 7, in which said angle is fixed.

14. The barbecue grill cart assembly as defined in claim 13, in which said angle is greater than 0°.

15. A barbecue grill cart assembly comprising:

a plurality of legs;

a brace means connecting the legs to form a generally rectangular frame structure; and a generally planar top member mounted to said frame structure with an upper surface having a middle section with an aperture formed therein for receiving a barbecue grill, said upper surface extending laterally from said aperture in a continuous manner to form a shelf member on at least one side thereof, said shelf member being fixed in position and disposed at an angle of less than 0° relative to said aperture.

* * * * *